Figure 6:
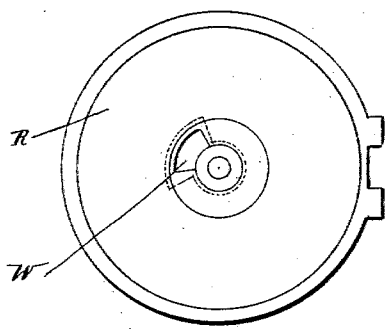

No. 629,878. Patented Aug. 1, 1899.
E. C. C. STANFORD.
DEVICE FOR MAKING INFUSIONS.
(Application filed Feb. 15, 1899.)
(No Model.) 3 Sheets—Sheet 1.
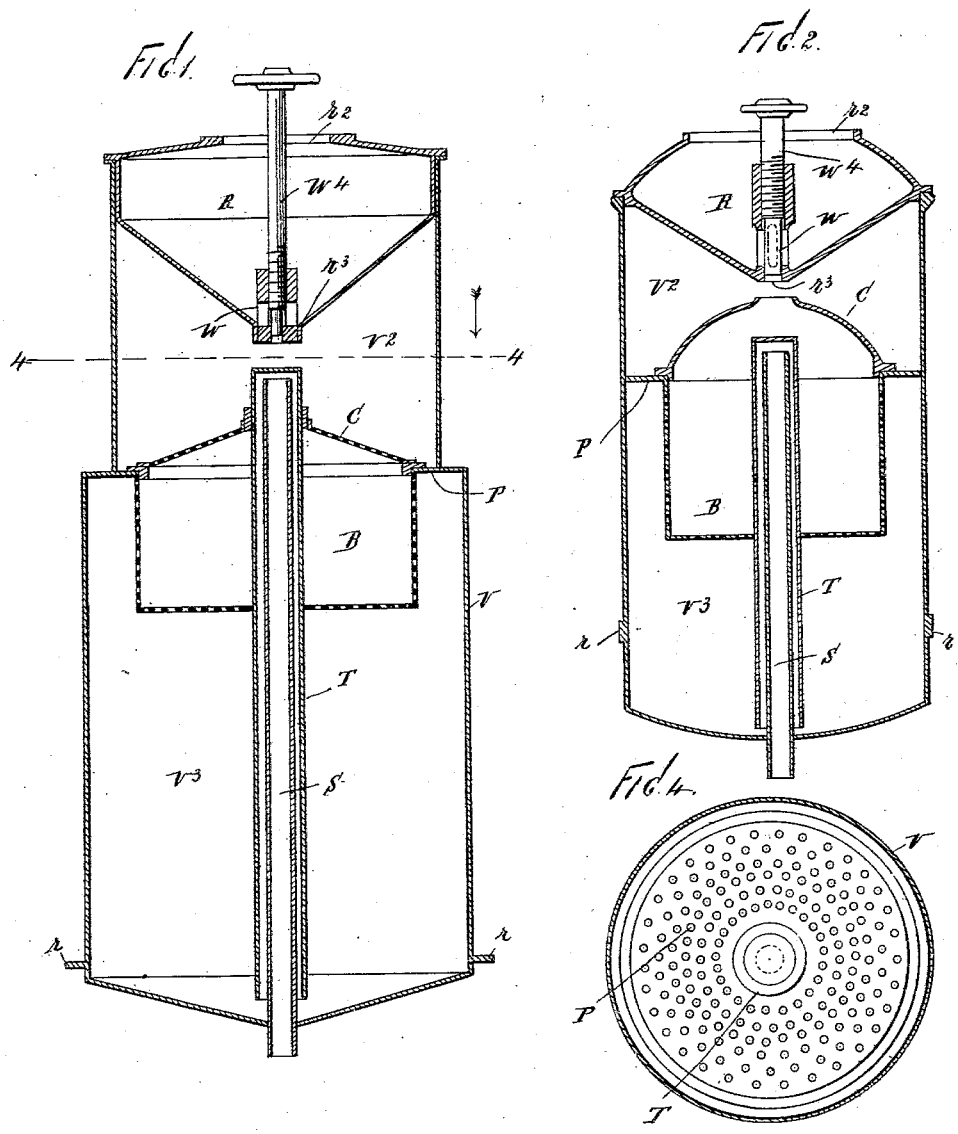

No. 629,878. Patented Aug. 1, 1899.
E. C. C. STANFORD.
DEVICE FOR MAKING INFUSIONS.
(Application filed Feb. 15, 1899.)
(No Model.) 3 Sheets—Sheet 2.
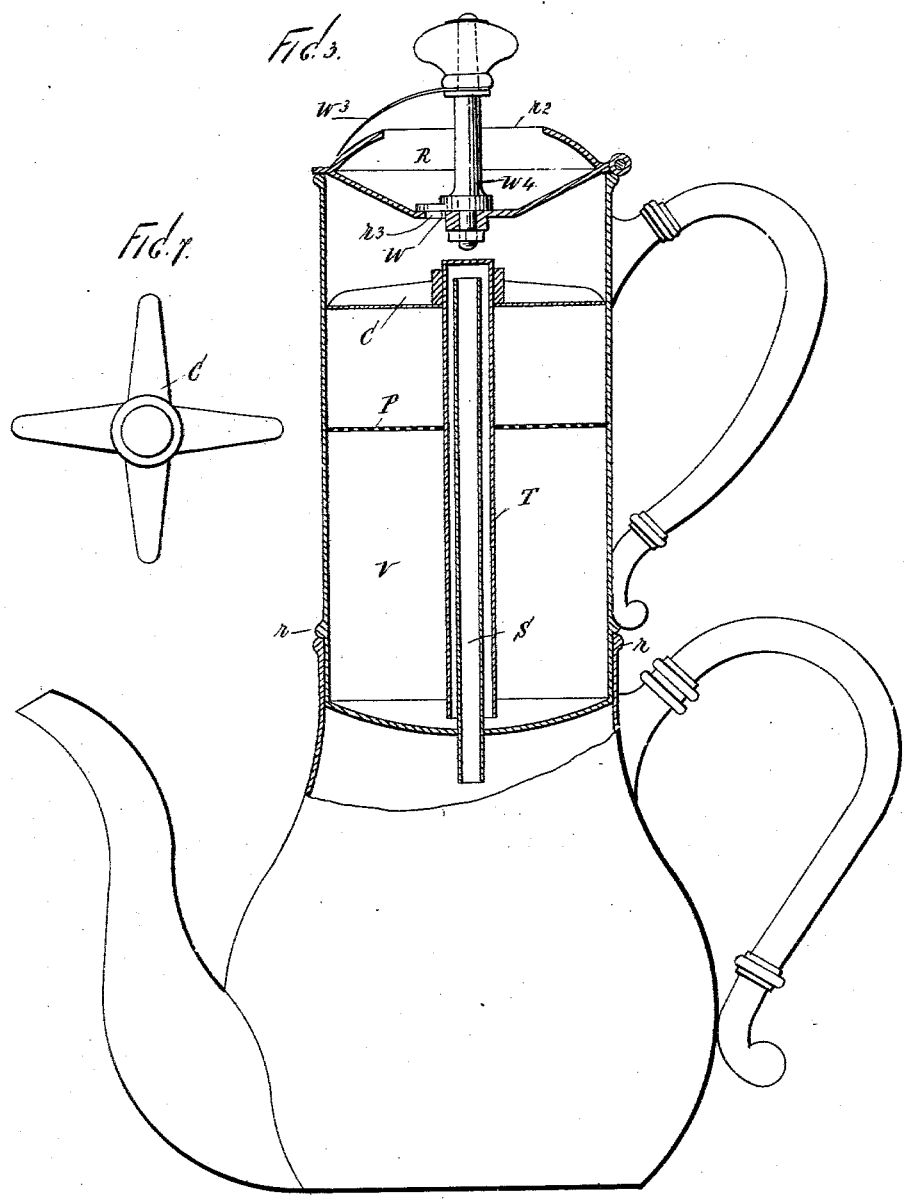
WITNESSES
John Buckler,
F. A. Stewart.
INVENTOR
Edward C. C. Stanford
BY
Edgar Tate & Co.
ATTORNEYS No. 629,878. Patented Aug. 1, 1899.
E. C. C. STANFORD.
DEVICE FOR MAKING INFUSIONS.
(Application filed Feb. 15, 1899.)

(No Model.) 3 Sheets—Sheet 3.

WITNESSES
John Buckler,
F. A. Stewart.

INVENTOR
Edward C. C. Stanford
BY
Edgar Tate & Co
ATTORNEYS.

UNITED STATES PATENT OFFICE.

EDWARD CHARLES CORTIS STANFORD, OF DALMUIR, SCOTLAND.

DEVICE FOR MAKING INFUSIONS.

SPECIFICATION forming part of Letters Patent No. 629,878, dated August 1, 1899.

Application filed February 15, 1899. Serial No. 705,564. (No model.)

*To all whom it may concern:*

Be it known that I, EDWARD CHARLES CORTIS STANFORD, a subject of the Queen of Great Britain, residing at Glenwood, Dalmuir, in the county of Dumbarton, Scotland, have invented certain new and useful Improvements in Devices for Making Infusions, of which the following is a full and complete specification, such as will enable those skilled in the art to which it appertains to make and use the same.

This invention relates to devices for making infusions; and the object thereof is to provide an improved device of this class for extracting soluble bodies from substances which contain them when such bodies are of different degrees of solubility in the liquid used to dissolve them.

Many substances, particularly vegetable substances, contain constituent elements, some of which dissolve more rapidly in a liquid than the others, and by reason of this fact it is possible to a considerable extent to separate such bodies from each other. This operation may be and usually is effected by macerating the substances in a liquid when those bodies which are the most soluble first enter into solution and by decanting or pouring off the infusion containing them before the other less soluble bodies have had time to be dissolved, the bodies that dissolve quickly being separated from the bodies that dissolve slowly. In making an infusion of ordinary tea, for example, for dietetic purposes it is desirable to separate the more soluble bodies before the tannin which all tea-leaves contain in varying proportions can have time to become dissolved, for the reason that not only are the refreshing and invigorating properties of an infusion of tea chiefly due to the more soluble bodies it contains, but owing to the presence of tannin is very deleterious to the digestive organs. It is therefore usual in making tea to remove the leaves from the infusion first produced by the boiling water within a few minutes after the maceration of the tea-leaf has commenced, and I find that if this be done within a period of from three to five minutes, depending upon the kind and quality of the tea-leaf employed, the resulting infusion contains but a very small proportion of tannin. In the same way in pharmacy a number of preparations are obtained from vegetable substances by taking advantage of the difference in the rate at which the bodies present dissolve during maceration, and inorganic bodies and mineral substances can be similarly separated from each other to a considerable extent. When this method of separation is used, means should be employed for quickly removing the solution containing the bodies most easily and quickly dissolved from further contact with the substances operated on, so that the bodies not so easily and quickly dissolved may be left behind. Also to effect the separation in the most advantageous manner the time of maceration should be controlled or regulated automatically, so as to avoid any error in such time and in order to dispense with the very careful attention otherwise necessary in order to arrest the maceration at the point which experience has found to be best. The apparatus or device which I employ consists of an infusion vessel or pot which effects the separation of bodies, as aforesaid, in the manner described, so that the maceration can be automatically arrested at any desired time, and said vessel or pot is also provided with means to control and render adjustable the working of the apparatus or device and to adapt it to the result desired to be obtained.

The invention is fully disclosed in the following specification, of which the accompanying drawings form a part, in which—

Figure 5:
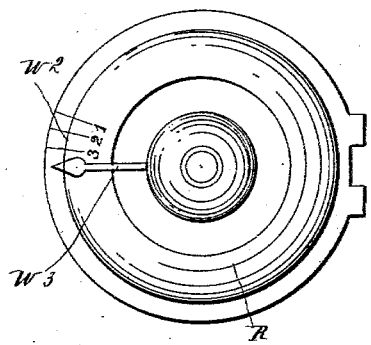
Figure 8:
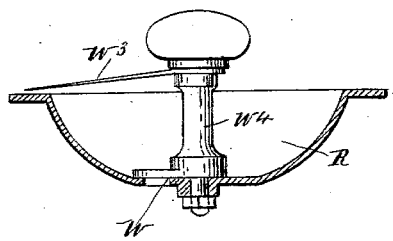
Figure 9:
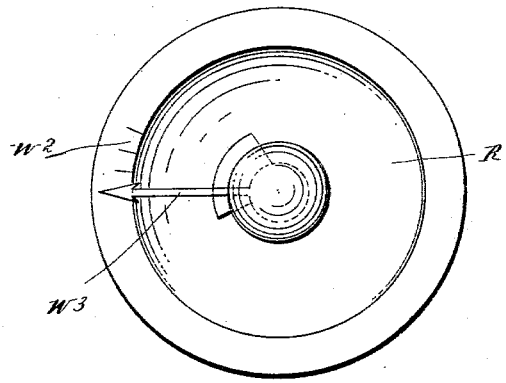

Figures 1 and 2 are vertical sections of an infusion vessel or pot made according to my invention, showing different forms of construction; Fig. 3, a similar view showing my improvement applied to an ordinary teapot; Fig. 4, a plan view of a perforated cover or basket which I employ, preferably taken on the line 4 4 of Fig. 1; Fig. 5, a plan view of a timing and starting reservoir with indicating-scale and showing an index-finger attached to an adjustable regulating-valve; Fig. 6, a plan view of the under side of the reservoir, showing the regulating-valve; Fig. 7, a plan view of the cruciform cover shown in Fig. 3 for retaining in place the substance treated, and Figs. 8 and 9 are a vertical section and plan of an open timing and starting reservoir and regulating-valve which I sometimes use.

In the drawings forming part of this specification the separate parts of my improvement are designated by the same letters of reference in each of the views, and in the practice of my invention I provide a vessel V, of cylindrical or other convenient shape, sometimes divided into upper and lower parts $V^2$ and $V^3$, of the same or of unequal sizes in cross-section, by a partition P and provided with a rim $r$ or projecting piece at the lower extremity, so that it may rest on the top of any conveniently-shaped vessel, as shown in Fig. 3, where it is supported by an ordinary teapot. The partition P may be flat and perforated, as shown in Fig. 3, or the center may be provided with a perforated cup or basket B, loose or fixed thereto, as shown in Figs. 1 and 2, in either case provided with a cover C, perforated or otherwise made as shown in the other figures, so as to retain the substance operated on in place.

T is a tube fixed to the center of the perforated partition P or cup or basket B, closed at its upper end, which projects some distance beyond the partition P into the upper part $V^2$ of the vessel V and open at its lower end, which is brought near to the bottom of the vessel V, which bottom is dished or otherwise shaped so as to converge toward the open end of the tube T.

Passing through the center of the converging bottom of the vessel V and projecting a short distance outside thereof is a tube S, fixed concentrically in the tube T and having both ends open and with its upper end near to the closed end of the tube T, so that both tubes form, as will readily be seen, a vertical siphon capable of discharging the liquid contents of the vessel V.

At the upper end of the vessel V, either wholly exterior to the removable cover thereof or formed within such cover, I provide a timing and starting reservoir R, open at the top, as shown at $R^2$, and at the bottom, as shown at $R^3$, the bottom of which is fitted with a regulating cock or valve W to adjust and control the rate of flow of the liquid contained therein from said reservoir into the vessel V.

The regulating-valve W may be of any preferred construction and regulated in the manner shown in any of the views Figs. 1, 2, 3, and 8, or a cock or valve of ordinary construction may be employed so long as it is made capable of regulating the flow gradually and slowly or quickly, according to the time required for the maceration of the substance operated on, and it is desirable that such valve should be provided with a regulating-scale $W^2$ and index-finger $W^3$, as shown in the drawings, said index-finger being connected with the stem $W^4$ of the valve W.

The parts of the apparatus above described may be made of any suitable metal or of earthenware, glass, or other material, according to the nature of the substance and liquid to be used in it, and the respective proportion of the sizes of such parts must be adjusted according to the working capacity of the apparatus. The siphon described must, however, be of ample size, so as to empty the vessel V quickly, and when such siphon is of the kind shown in the drawings I find that a good proportion between the sizes of the respective tubes is to make the outer tube T about twice the diameter of the inner tube S.

The timing and starting reservoir R should be capable of holding an excess of liquid beyond that which will be contained in the upper part of the vessel V between the working level of the liquid therein and the top of the siphon-tube T, so as to insure an even flow during the operation and so that the siphon will be fully charged and so come into action with certainty and rapidity.

The method of working the apparatus is as follows: A vessel to receive the liquid discharged from the apparatus is placed underneath it, the perforated cage or basket B is filled with the substance to be macerated or it is evenly spread over the perforated partition P, and the cover C is placed in position. The liquid used to effect the solution is poured into the vessel at a suitable temperature—e. g., boiling water in the case of tea—until it covers the substance to be macerated and rises above the lower edge of the cover C. The timing and starting reservoir R is then filled with liquid at the same temperature, and the regulating-valve is adjusted so that the rate of flow is such that the level of the liquid in the vessel V rises nearly to the top of the tube T by the time that the soluble bodies to be separated from the substances have become dissolved. The liquid continuing to flow from the reservoir R into the vessel V thus charges the siphon, which, coming into operation in a short space of time, siphons over the whole of the infusion so made and delivers it into the vessel placed to receive it. The regulating-valve can easily be adjusted to bring the siphon automatically into operation at any desired time by means of the regulating-scale and index-finger thereon before described.

I do not confine my invention to the particular arrangement or disposition of parts shown on the drawings annexed, because it is manifest that these may be varied without departing from the essence of my invention. For instance, the infusion vessel may be of any other shape or form; the partition P may be omitted and the cage or basket B simply fixed to the tube T, which may be secured in place on the tube S; the timing and starting reservoir may be wholly outside the vessel V and separated therefrom and any form of regulating-valve may be used; the siphon need not be placed in the center of the vessel, but may be formed in the side thereof or partly external thereto and may be any form of siphon desired; but notwithstanding any such variations in the form and disposition of such parts so long as the whole of them coöperate together substantially in the manner described and so as to secure the same result such variations may be made without departing from the essential features of my invention.

Having fully described my invention, I claim as new and desire to secure by Letters Patent—

1. A device of the class described, comprising a suitable vessel, a tube closed at the upper end and open at the lower end and fixed centrally in said vessel, and the lower end of which extends downwardly nearly to the bottom of said vessel, another tube fixed concentrically in said first-named tube and open at both ends and projecting through the bottom of said vessel, a perforated receptacle through which the upper end of the first-named tube passes, and a reservoir located above said receptacle and above said first-named tube, said reservoir being open at the bottom and provided with a valve for controlling said opening, substantially as shown and described.

2. A device of the class described, comprising a vessel divided into upper and lower compartments, a perforated receptacle fixed in the upper part of the lower compartment, a tube passing through said receptacle the upper end of which is closed, and the lower end of which is open, and extended downwardly nearly to the bottom of said vessel, another tube fixed in said first-named tube, and extending through the bottom of said vessel and almost to the top of said first-named tube, and a reservoir fixed in the top of said vessel or in the upper compartment thereof, and the bottom of which is open and provided with a regulating-valve, substantially as shown and described.

3. A device of the class described, comprising a vessel divided into upper and lower compartments, a perforated receptacle fixed in the upper part of the lower compartment, a tube passing through said receptacle the upper end of which is closed, and the lower end of which is open, and extended downwardly nearly to the bottom of said vessel, another tube arranged within said first-named tube, and extending through the bottom of said vessel and almost to the top of said first-named tube, and a reservoir fixed in the top of said vessel or in the upper compartment thereof, and the bottom of which is open and provided with a regulating-valve, the top of said reservoir being also provided with a circularly-arranged scale, and said valve being provided with a stem to which is secured a pointer, substantially as shown and described.

In testimony that I claim the foregoing as my invention I have signed my name, in presence of the subscribing witnesses, this 27th day of January, 1899.

EDWARD CHARLES CORTIS STANFORD.

Witnesses:
JOHN RUSSELL AITKEN,
GEORGE MCLEOD TOWET.